(12) United States Patent
Hoch et al.

(10) Patent No.: US 11,725,101 B2
(45) Date of Patent: Aug. 15, 2023

(54) PHTHALIC ANHYDRIDE MODIFIED POLYMER RUBBERS OF ETHYLENE-GLYCIDYLMETHACRYLATE-VINYL ACETATE AND EPOXY RESINS COMPRISING THE SAME

(71) Applicant: ARLANXEO DEUTSCHLAND GMBH, Dormagen (DE)

(72) Inventors: Martin Hoch, Pudong New District (CN); Susanna Lieber, Kaiserslautern (DE); Piming Ma, Jiangsu (CN); Qianqian Wang, Jiangsu (CN); Pengwu Xu, Jiangsu (CN)

(73) Assignee: ARLANXEO DEUTSCHLAND GMBH, Dormagen (DE)

( * ) Notice: Subject to any disclaimer, the term of this patent is extended or adjusted under 35 U.S.C. 154(b) by 0 days.

(21) Appl. No.: 17/905,343

(22) PCT Filed: Feb. 26, 2021

(86) PCT No.: PCT/EP2021/054806
§ 371 (c)(1),
(2) Date: Aug. 31, 2022

(87) PCT Pub. No.: WO2021/175710
PCT Pub. Date: Sep. 10, 2021

(65) Prior Publication Data
US 2023/0090128 A1 Mar. 23, 2023

(30) Foreign Application Priority Data

Mar. 2, 2020 (WO) ............... PCT/CN2020/077493

(51) Int. Cl.
*C08L 63/00* (2006.01)
*C08L 33/14* (2006.01)
*C08L 33/06* (2006.01)
*C08G 59/38* (2006.01)
*C08G 59/42* (2006.01)
*C09J 163/10* (2006.01)

(52) U.S. Cl.
CPC ............ *C08L 33/064* (2013.01); *C08G 59/38* (2013.01); *C08G 59/42* (2013.01); *C09J 163/10* (2013.01)

(58) Field of Classification Search
CPC ............................. C08L 33/068; C08L 63/00
USPC ................................... 523/427, 434
See application file for complete search history.

(56) References Cited

U.S. PATENT DOCUMENTS 4,720,524 A * 1/1988 Ohmae .................. C09J 167/02
525/166
2013/0300020 A1 11/2013 Leibler et al.
2017/0335037 A1 11/2017 Taschner et al.

FOREIGN PATENT DOCUMENTS

EP 3 015 483 A1 5/2016
JP 2001139770 A * 5/2001 .............. C08L 63/00

OTHER PUBLICATIONS

Machine translation of JP-2001139770-A (no date).*
International Search Report dated Jul. 2, 2021, issued in connection with PCT International Application No. PCT/EP2021/054806.
Written Opinion issued in connection with PCT International Application No. PCT/EP2021/054806.

* cited by examiner

*Primary Examiner* — Michael J Feely
(74) *Attorney, Agent, or Firm* — Norris McLaughlin, P.A.

(57) ABSTRACT

The present disclosure relates to rubber polymers of ethylene-glycidylmethacrylate-vinyl acetate polymer as modifiers in epoxy resins. In particular ethylene-glycidylmethacrylate-vinyl acetate rubber polymers comprising phthalic anhydride modified glycidyl methacrylate monomer units.

14 Claims, 2 Drawing Sheets

PHTHALIC ANHYDRIDE MODIFIED POLYMER RUBBERS OF ETHYLENE-GLYCIDYLMETHACRYLATE-VINYL ACETATE AND EPOXY RESINS COMPRISING THE SAME

This application is a 371 of International Patent Application No. PCT/EP2021/054806, filed Feb. 26, 2021, which claims priority of International Patent Application No. PCT/CN2020/077493, filed Mar. 2, 2020, the disclosures of which patent applications are hereby incorporated herein by reference.

FIELD OF INVENTION

The present invention relates to rubber polymers of ethylene-glycidylmethacrylate-vinyl acetate polymer. The ethylene-glycidylmethacrylate-vinyl acetate polymer comprises phthalic anhydride modified glycidyl methacrylate monomer units and are used as modifiers for epoxy resins. The present invention also relates to a method for the manufacture thereof and kits comprising the same for epoxy resins.

BACKGROUND OF INVENTION

Epoxy resins are thermoset compounds with a complicated cross-linked polymeric structure. Epoxy resins are formed by curing (reacting) a two part mixture of a first part providing an epoxy functionality and a second part providing a curing agent.

The curing agents are often referred to as curatives, hardeners or converters. The curing agents can be an anhydride such as phthalic anhydride. Phthalic anhydride is a result of the elimination of water from phthalic acid.

Depending on a complexity of the first part providing the epoxy functionality and the complexity of the second part providing the curing agent a wide range of characteristics of the epoxy resin results, such as; desirable physical and mechanical properties, thermal stability, chemical resistance and process ability. The characteristics of the epoxy resins make them desirable in a wide range of applications for example in coatings, adhesives, aeronautical and electronic components.

The aforementioned types of epoxy resins however suffer from numerous problems such as brittleness, low fracture resistance, poor impact strength and high notch sensitivity.

These problems limit a use of the epoxy resins in various applications where such problems need to be overcome.

The Handbook of Epoxy Blends, Chapter: 10, Springer International, H. Kargarzadeh et al, "Mechanical properties of Epoxy Rubber Blends" discloses that a method to overcome these problems, is via the incorporation of a dispersed rubber phase (as either core-shell rubber particles or miscible reactive rubber particles) when curing (reacting) the two part mixture of the first part providing an epoxy functionality and the second part providing the curing agent to form a rubber blended epoxy resin. However the resultant epoxy resin exhibits a two-phase microstructure of rubber particles dispersed in the epoxy resin matrix. The two-phase microstructure often undergoes phase separation at an interface of the dispersed rubber phase and the epoxy resin bulk mass. The phase separation is due to a weak interaction between the dispersed rubber phase and the epoxy resin bulk mass, which undermines the desired properties of the epoxy resin.

A type of miscible reactive rubber based on liquid acrylonitrile-butadiene copolymers with end-group functionality such as carboxy groups (CTBN) are known in the art. However these miscible reactive rubber based on liquid acrylonitrile-butadiene copolymers with end-group functionality such as carboxy groups (CTBN) are required in relatively high dosage (above 15 phr) due to the low molecular weight, which causes losses of strength, modulus and heat resistance of the final epoxy resin. Environmental ozone is known to adversely affect materials containing double bonds, leading to crack formation and loss of mechanical strength. Acrylonitrile-butadiene copolymers with end-group functionality such as carboxy groups (CTBN) comprise a high double-bond content leading the aforementioned deficiencies.

Rubber polymers of ethylene-glycidylmethacrylate-vinyl acetate are known in the art as disclosed for example in EP 3015483 and respectively in its family member US 2017/335037 A1. Further, kits for manufacturing an epoxy resin are described in US 2013/300020 A1.

There is a need to overcome the aforementioned problems of the prior art.

SUMMARY OF INVENTION

In a first aspect the present invention relates to a resin composition comprising an epoxy resin and a modifier, wherein the modifier comprises an ethylene-glycidylmethacrylate-vinyl acetate polymer comprising phthalic anhydride modified glycidyl methacrylate monomer units.

In a further aspect the present invention relates to a method for the manufacture of the aforementioned ethylene-glycidylmethacrylate-vinyl acetate polymer, the method comprising, reacting an ethylene-glycidylmethacrylate-vinyl acetate polymer with phthalic anhydride, wherein ethylene-glycidylmethacrylate-vinyl acetate polymer is homogenised with phallic anhydride at a first temperature and then reacted at second temperature higher than the first temperature.

In a further aspect the present invention relates to a kit for the manufacture of an epoxy resin, the kit comprising an ethylene-glycidylmethacrylate-vinyl acetate polymer comprising phthalic anhydride modified glycidyl methacrylate monomer units, a curing agent and an agent providing an epoxy functionality.

In a further aspect, the present invention relates to the use of an ethylene-glycidylmethacrylate-vinyl acetate polymer comprising phthalic anhydride modified glycidyl methacrylate monomer units as a modifier for an epoxy resin.

The ethylene-glycidylmethacrylate-vinyl acetate polymer comprising phthalic anhydride modified glycidyl methacrylate monomer units, maintains reactivity towards curing agents and an agent providing an epoxy functionality. The ethylene-glycidylmethacrylate-vinyl acetate polymer comprising phthalic anhydride modified glycidyl methacrylate monomer units ensures internal bonding within the epoxy resin overcoming the problems associated with a two-phase microstructure of the prior art with significant improvement on impact strength. The ethylene-glycidylmethacrylate-vinyl acetate polymer comprising phthalic anhydride modified glycidyl methacrylate monomer units fulfils the desired impact toughening effect at relatively low dosages when used in an epoxy resin kit. The impact strength is significantly improved using the modifier of the present invention.

DETAILED DESCRIPTION

For a complete understanding of the present invention and the advantages thereof, reference is made to the following detailed description.

It should be appreciated that the various aspects and embodiments of the detailed description as disclosed herein are illustrative of the specific ways to make and use the invention and do not limit the scope of invention when taken into consideration with the claims and the detailed description. It will also be appreciated that features from different aspects and embodiments of the invention may be combined with features from different aspects and embodiments of the invention.

In a first aspect the present invention relates to a resin composition comprising an epoxy resin and a modifier, characterized in that the modifier comprises an ethylene-glycidylmethacrylate-vinyl acetate polymer comprising phthalic anhydride modified glycidyl methacrylate monomer units.

Ethylene-glycidylmethacrylate-vinyl acetate polymers are a rubber polymer known in the art. Ethylene-glycidylmethacrylate-vinyl acetate rubber polymers are manufactured from the monomers ethylene, vinyl acetate and glycidyl methacrylate as disclosed for example in EP 3015483, the teachings of which are incorporated herein by reference.

An exemplary structure of the ethylene-glycidylmethacrylate-vinyl acetate polymer is shown below in Formula I. The exemplary structure doesn't show the specific amounts of the monomers ethylene, vinylacetate and glycidyl methacrylate or the overall chain length.

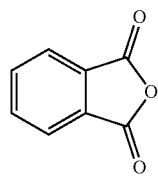

Phthalic anhydride

In the context of the present disclosure it is to be understood that modified means, reacted or grafted in which the phthalic anhydride forms a reaction product with the glycidyl methacrylate monomer units of the ethylene-glycidylmethacrylate-vinyl acetate polymer.

Since phthalic anhydride is a curing agent, the ethylene-glycidylmethacrylate-vinyl acetate polymer comprising phthalic anhydride modified glycidyl methacrylate monomer units has improved compatibility with a further curing agent and an agent providing an epoxy functionality when used in forming an epoxy resin.

Although phthalic anhydride was used, other dicarboxylic acids or even tricarboxylic acids can be used, such as aliphatic dicarboxylic acids like malonic acid, succinic acid, glutaric acid, adipic acid, pimelic acid, azelaic acid, sebacic acid, dodecane-dicarboxylic acid, tetradecane-dicarboxylic

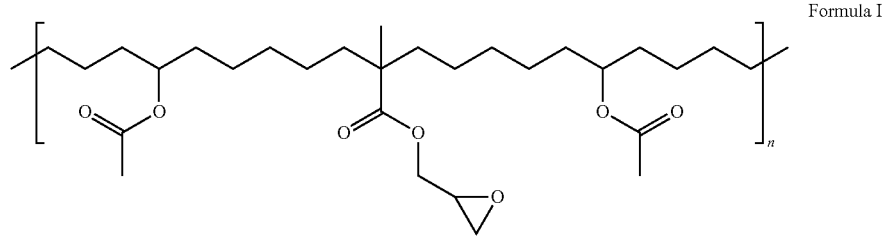

Formula I

Thus the exemplary structure of the ethylene-glycidylmethacrylate-vinyl acetate polymer comprising phthalic anhydride modified glycidyl methacrylate monomer units could be represented by Formula II.

acid, octadecane-dicarboxylic acid, eicosane-dicarboxylic acid, alkyl-malonic acids, tetramethyl-succinic acid, 2-2'-dimethyl-succinic acid, malein acid, citraconic acid, 1,2,3-propanetricarboxylic acid, ethylenediamine-tetraacetic acid,

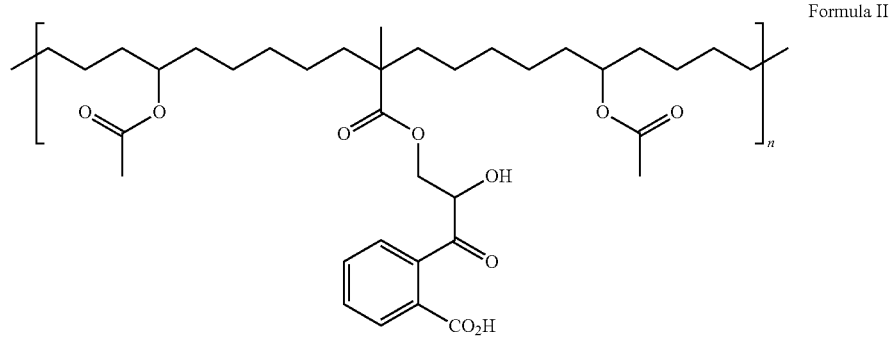

Formula II

Thus the ethylene-glycidylmethacrylate-vinyl acetate polymer according to the present invention is based on modifying at least some glycidyl methacrylate monomer units of the ethylene-glycidylmethacrylate-vinyl acetate polymers with phthalic anhydride.

aromatic acids like phthalic acid, methyl-phthalic acids, terephthalic acid, hexahydrophthalic acid, methyl-hexahydrophthalic acid, tetrahydrophthalic acid and methyl-tetrahydrophthalic acid or even combinations thereof.

The ethylene-glycidylmethacrylate-vinyl acetate polymer comprising phthalic anhydride modified glycidyl methacrylate monomer units has preferably the following composition. The monomer vinyl acetate units should be present in a range of 25-75 wt %, the range provides a presence of a large enough rubber amorphous phase and provides that a rubber amorphous phase has a glass transition temperature (Tg) below room temperature. The monomer glycidyl methacrylate should be present in a range of 1-25 wt %, which is then relevant in the phthalic anhydride modified glycidyl methacrylate monomer units.

A sum of the three monomers ethylene, vinyl acetate and glycidyl methacrylate could be 100%; however other monomer units may be present.

The ethylene-glycidylmethacrylate-vinyl acetate polymer comprising phthalic anhydride modified glycidyl methacrylate monomer unit has preferably the following molecular weight. The molecular weight should be at least 10,000 g/mol (Mn). The molecular weight may be above 40,000 g/mol (Mn) to avoid the drawbacks of liquid rubber modifiers of the prior art (loss of modulus strength). It is observed that when using liquid rubber modifiers of the prior art a necessary phase separation during curing of the epoxy resin depends on curing conditions and this results in uneven phase separation. When using the molecular weight according to the above, a phase separation sets in easier, resulting in more even and surprisingly smaller particle size distributions in the epoxy matrix. The preferred molecular weight above 40,000 g/mol furthermore facilitates easier handling in epoxy applications.

The ethylene-glycidylmethacrylate-vinyl acetate polymer comprising phthalic anhydride modified glycidyl methacrylate monomer units is modified with a degree of modification (also referred to as grafting degree or GD) of at least 0.25% of the glycidyl methacrylate monomer units with phthalic anhydride. This degree of modification ensures a sufficient reactivity of the carboxylic groups of the phthalic anhydride when forming an epoxy resin for interfacial bonding. The degree of modification can be at least 0.5%. It is to be appreciated that there is no upper limit for the degree of modification, except a possible complete modification with of phthalic anhydride with all glycidyl methacrylate monomer units to give the degree of modification being 100%.

Thus the degree of modification is important for the benefits brought about by the ethylene-glycidylmethacrylate-vinyl acetate polymer comprising phthalic anhydride modified glycidyl methacrylate monomer units as certain minimum degree of grafting is necessary.

A grafting efficiency (GE) is a mass ratio of grafted phthalic anhydride content to the initially provided phthalic anhydride, as further discussed below. It is understood that the GE can be increased by choosing the ethylene-glycidylmethacrylate-vinyl acetate polymer with a higher content of glycidyl methacrylate monomer units and more phthalic anhydride.

Regarding mechanical properties, it might be advantageous that the amount of modifier in the composition is in a range of up to 20 wt.-%, referring to the epoxy resin. This might especially improve the impact strength, wherein the best results may be found in case the amount of modifier in the composition is in a range of 2 to 12 wt.-%, such as 3 to 8 wt.-% referring to the epoxy resin.

Regarding tensile strength, it might be preferred if the amount of modifier in the composition is in a range of up to 15 wt.-%, referring to the epoxy resin.

In a further aspect the present invention relates to a method for a manufacture of ethylene-glycidylmethacrylate-vinyl acetate polymer comprising phthalic anhydride modified glycidyl methacrylate monomer units. The method comprising, reacting ethylene-glycidylmethacrylate-vinyl acetate polymers with phthalic anhydride.

The phthalic anhydride thus reacts with the epoxy groups of the glycidyl methacrylate monomer units, thus modifying them in part with phthalic anhydride which is the curing agent and hence providing additional curing ability.

According to the method for the manufacture, the ethylene-glycidylmethacrylate-vinyl acetate polymer is mixed with phthalic anhydride to form a homogenous mixture.

Due to a polymeric and viscous nature of the starting materials and the products, a suitable mixer is used such as a melt mixer, a Z-blade mixer or an internal mixer. Such mixers provide sufficient mechanical mixing for the starting materials and the products and further allows a control of temperature by appropriate cooling or heating facilities. Such mixers are known in the art in the rubber industry. However, is also possible to carry out the reaction in solution if a solution based epoxy compound is intended to be manufactured.

It is preferable that the phthalic anhydride is used in a molar excess of up to 1.5 in order to cap the glycidyl groups of the glycidyl methacrylate monomer units and to avoid crosslink reactions. The ethylene-glycidylmethacrylate-vinyl acetate polymer may be mixed with phthalic anhydride in an amount of 100/5, wt/wt, however this can depend on the amount of the glycidyl methacrylate monomer units in ethylene-glycidylmethacrylate-vinyl acetate polymer.

A purpose of the first step is to homogenise the ethylene-glycidylmethacrylate-vinyl acetate polymer with phthalic anhydride without any reaction. The first step is carried out at a temperature in a range of 40-120° C. The first step is carried out at a mixing rate in a range of 30-70 rpm. The first step is carried out for a time in a range of 5-30 mins. It is to be appreciated that any of the temperatures, mixing rates and times can be combined to homogenise the ethylene-glycidylmethacrylate-vinyl acetate polymer with phthalic anhydride. Since achieving the homogenous mixture may depend on amounts of the ethylene-glycidylmethacrylate-vinyl acetate polymer and phthalic anhydride, a size of a mixing vessel for example may be determined accordingly by one skilled in the art. It is nevertheless appreciated that a higher temperature in the range noted above leads to a higher viscosity and thus a more rapid formation of the homogenous mixture.

The mixture is then subjected to a second step in which a higher temperature, such in a range of 130-160° C., is used. The second temperature is determined by carrying out the reactions at different temperatures and determining a gel content of the product such that no gel is formed which can be determined by suitable test experiments beforehand. The formation of gel should be avoided and/or minimised in order to not to create difficulties for dissolution in an epoxy resin kit or the final epoxy resin. The ethylene-glycidylmethacrylate-vinyl acetate polymer comprising phthalic anhydride modified glycidyl methacrylate monomer units is thus preferably gel-free.

The mixing rates and the mixing times can be those as used in the first step.

Thus, the ethylene-glycidylmethacrylate-vinyl acetate polymer is homogenised with phthalic anhydride at a first temperature and then reacted at second temperature higher than the first temperature The reaction mixture is then worked-up to remove unreacted phthalic anhydride and provide the final product, the ethylene-glycidylmethacrylate-vinyl acetate polymer comprising phthalic anhydride modified glycidyl methacrylate monomer units. The mixture is dissolved in a solvating solvent (e.g. chloroform) at room temperature to form a solution. A non-solvating solvent (e.g. ethanol) is then added in excess to precipitate out the ethylene-glycidylmethacrylate-vinyl acetate polymer comprising phthalic anhydride modified glycidyl methacrylate monomer units. The work-up is repeated three times.

The product, the ethylene-glycidylmethacrylate-vinyl acetate polymer comprising phthalic anhydride modified glycidyl methacrylate monomer units, is then dried to ensure removal of the solvating solvent and/or non-solvating solvent (the presence of which can be identified by $^1$H NMR). The drying can be conducted in any suitable means known in the art such as a drying oven and or under vacuum. A drying temperature can be in a range of 50-60° C.

The product, the ethylene-glycidylmethacrylate-vinyl acetate polymer comprising phthalic anhydride modified glycidyl methacrylate monomer units is identified by $^1$H NMR and UV spectroscopy.

The grafting efficiency (GE) and the grafting degree (GD) are calculated by $^1$H NMR data.

Calculation of the GE and GD is as follows.

NMR peak area is proportional to a content of the corresponding components of the ethylene-glycidylmethacrylate-vinyl acetate polymer comprising phthalic anhydride modified glycidyl methacrylate monomer units. The content of the ethylene-glycidylmethacrylate-vinyl acetate polymer component remains constant after removing the unreacted phthalic anhydride, so a ratio of a peak area corresponding to unreacted phthalic anhydride to the peak area corresponding to ethylene-glycidylmethacrylate-vinyl acetate polymer comprising phthalic anhydride modified glycidyl methacrylate monomer units can reflect the content of grafted phthalic anhydride. The grafting efficiency (GE) is the mass ratio of grafted phthalic anhydride content to the initially provided phthalic anhydride. The grafting efficiency can be calculated by the following formula:

$$GE = \frac{A'_b}{A'_a} \Big/ \frac{A_b}{A_a} \times 100\%$$

where A and A' are the resonance peak areas of the un-purified and purified blends respectively, b refers to a peak of the aromatic portion of the phthalic anhydride (reacted or unreacted) and a refers to a reference peak in the terpolymer such as the secondary CH adjacent to the acetate ester groups.

The grafting degree (GD, i.e., weight percentage of the grafted phthalic anhydride in the purified blends) can be calculated by the following equation:

$$GD = \frac{A \times GE}{B + A \times GE} \times 100\%$$

where B and A are the parts by weight of ethylene-glycidylmethacrylate-vinyl acetate polymers and phthalic anhydride in the blends, respectively.

Thus for example GD and GE can be manipulated (and is within the ability of one skilled in the art based on the present disclosure) based on content of glycidyl methacrylate monomer units in the polymer, amounts of phthalic anhydride, longer reaction times or further optimised reaction temperatures which can contribute to higher GD enhancing the benefit of the inventive polymer.

In a further aspect the present invention relates to a kit for the manufacture of an epoxy resin. The kit comprising the ethylene-glycidylmethacrylate-vinyl acetate polymer comprising phthalic anhydride modified glycidyl methacrylate monomer units, a curing agent and an agent providing an epoxy functionality. A ratio between the agent providing an epoxy functionality and the curing agent is determined by considering an epoxy equivalent of the curing agent.

In the kit, one equivalent of curing agent should be present with two equivalents of the agent providing an epoxy functionality.

The ethylene-glycidylmethacrylate-vinyl acetate polymer comprising phthalic anhydride modified glycidyl methacrylate monomer units is present in an amount of up to 15 wt % in the kit.

The curing agent can be an anhydride, such as those derived from phthalic anhydride, preferably the hydrogenated and alkylated types such as methyl-tetrahydrophthalic anhydride, hexahydro-methyl-phthalic anhydride and hexahydrophthalic anhydride. The curing agent can be a pyromellitic dianhydride, a trimellitic anhydride, a nadic anhydride, a nadic methyl anhydride, various alkylated succinic anhydrides and maleic anhydride. The curing agent can be derived from ethylenediamine-tetraacetic acid (EDTA) after conversion into its respective anhydrides.

The agent providing the epoxy functionality can be multifunctional glycidyl ethers which can be obtained from reaction products with epichlorohydrin, such as glycidyl ethers from bisphenol A or bisphenol F. Depending on a ratio of epichlorohydrin and bisphenol A epoxy compound of various chain length and viscosity can be obtained. Glycidyl ethers of cresol and more generally various di- and trihydric phenols, of various polyols like glycerol, pentaerythritol, tetraphenol-ethane, trimethylol propane and trimethylol ethane, glycidyl-ethers of novolac resins. Cycloaliphatic glycidyl ether is preferred for superior UV resistance. The agent providing the epoxy functionality can be epoxy compounds which contain 3,4-epoxycyclohexyl-groups such as 3,4-epoxy cyclohexyl-methyl-3,4-epoxy cyclohexane carboxylate. The agent providing the epoxy functionality can be provided by combining oligo-amino precursors with epichlorohydrin to glycidyl compounds which gives epoxy resins with high functionality. Anhydrides can also be converted into epoxy compounds such as hexahydrophthalic acid diglycidyl ester. The agent providing the epoxy functionality can also be based on linear oligomers with terminal epoxy groups such as liquid polybutadiene with epoxy end-groups, polyethers with terminal epoxy groups or simpler diglycidylethers of alkylene-diols. Glycidyl amines can provide reactivity from both the glycidyl group and the amino functionality. The agent providing the epoxy functionality can also be used in their function as reactive diluents for the purpose of lowering the viscosity for example. The agent providing the epoxy functionality is preferably a liquid at room temperature. The agent providing the epoxy functionality preferably has a molecular weight in a range of from 200-800 g/mol. This range is determined by the need to provide easy to handle liquid epoxy agent and to have a suitable high enough epoxy group content. The number of epoxy groups is determined by the desired crosslink density after curing and necessary flexibility.

The kit for the manufacture of the epoxy resin may contain at least one catalyst. The catalyst is used to speed-up the curing reaction when forming the epoxy resin. The catalysts can be quaternary ammonium salts, quaternary phosphonium salts, substituted imidazoles, transition metal salts, phosphine compounds, metal acetylacetonates and amino-compounds, such as dimethylaminomethyl-phenol. The catalyst can be at least one of the aforementioned or any combination thereof. A choice of the catalyst depends on a desired curing rate and the processing temperature. An amount of the at least one catalyst is in the range from 0.5-5 vol %. This range is preferable since more amounts low molecular weight materials in the final epoxy resin have a negative effect on the mechanical properties of the epoxy resin.

The kit for the manufacture of the epoxy resin may contain at least one filler. The at least one filler can be used to add certain functionality to resultant epoxy resins, such as abrasion resistance, overcoming shrink reduction, to give thermos-conductivity or electrical conductivity or to modify a viscosity of the uncured epoxy resin. The fillers can be silica particles such as fumed silica to provide thixotropic properties, quartz, small glass beads may control shrink, mica may lower a friction coefficient; glass fibres, carbon fibres and nano-sized fibres help to further increase the modulus and/or also impact resistance. Without limiting the choice only a few are mentioned here such as aluminium hydroxide for flame retardency, aluminium oxide or boron-nitride for thermos-conductivity, Al flakes, silver powder and carbon black may provide antistatic effects or electrical conductivity, metal sulphates, talcum and clays may reduce costs. The dosage is limited in order not to affect the mechanical and adhesion performance of the final epoxy resin. As fillers can have a broad range of densities one can consider a volume fraction of the at least one filler in the kit and thus up to 20-vol %.

A use of ethylene-glycidylmethacrylate-vinyl acetate polymer comprising phthalic anhydride modified glycidyl methacrylate monomer units in epoxy resins increases an impact strength and a fracture toughness of the epoxy resin. Mechanical properties such as modulus, glass transition of the resin phase and a viscosity before cure are only minimally affected.

Thus, a further aspect of the present invention is a use of an ethylene-glycidylmethacrylate-vinyl acetate polymer comprising phthalic anhydride modified glycidyl methacrylate monomer units as a modifier for an epoxy resin.

The following analytic tools were used.

$^1$H Nuclear Magnetic Resonance (NMR) analysis was measured using a 400 MHz Bruker Advance 2B spectrometer using $CDCl_3$ as solvent.

The molecular weight was measured by GPC in THF/$CHCl_3$ following the procedure outlined in EP 3015483.

Visible Light Transmittance. Transparency was measured using an UV-visible spectrophotometer (TU-1901, Beijing Purkinje General Instrument Co. Ltd.). Air was used as blank reference, and transmittance spectra were recorded in a wavelength range of 200-800 nm.

Rheology Analysis. Viscosity was measured on a rheometer (Discovery DHR-2, TA Instruments, USA) with a diameter of 25 mm aluminium parallel plates at the temperature of 25° C. Frequency sweeps from 1-1000 Hz were performed at a strain of 1%.

Differential Scanning calorimetry (DSC). Thermal analysis was measured on a thermal analyser (Netzsch 204 F1, Germany). About 5 mg of each sample was heated from 30-200° C. at 10° C./min under a $N_2$ atmosphere.

Dynamic Mechanical Analysis (DMA). Thermomechanical behaviour was measured on a DMA-Q800 (TA Instruments). The specimens (60×10×4 $mm^3$) were heated under a double cantilever mode from −30-180° C. at 3° C./min. The amplitude and frequency were set as 15 μm and 1 Hz, respectively.

Thermogravimetric Analysis (TGA). Thermal stability was measured using TGA (1100SF, Mettler-Toledo, Switzerland) from 50-600° C. at 10° C./min under a $N_2$ atmosphere.

Mechanical Properties. Tensile properties were measured on a tensile tester (Instron5967, USA) at 5 mm/min, and the geometry of the parallel section of the dumbbell-shaped tensile bar is 60×10×4 $mm^3$.

Unnotched impact strength was measured using a pendulum impact tester (HIT-2492, China), sample dimension was 80×10×4 $mm^3$. The measurements were performed at a temperature of 23° C. and at least five independent specimens were tested to obtain the average values for each sample.

Fracture Toughness. Critical stress intensity factor (KIC) and critical strain energy release rate (GIC) was measured using a tensile tester (Instron5967, USA) under a three-point-bend (SEN-3PB) mode according to the ASTM D5045 standard. The geometry of the samples was 53×12×6 $mm^3$. All samples were tapped using a razor blade to create sharp cracks with a 6 mm length. The measurements were carried out under a constant displacement rate of 1 mm/min.

Scanning Electron Microscopy (SEM). Impact-fractured surfaces was measured using a SEM (S-4800, HITACHI, Japan) at an accelerating voltage of 3.0 kV. Before testing, the fractured surfaces of the samples were coated with a thin evaporated layer of gold.

Transmission Electron Microscopy (TEM). Phase morphologies of the samples were observed by using TEM (200 kV, JEOL-JEM-2100, Japan). The samples were ultra-microtomed at −120° C. to a section with a thickness of ~70 nm. The ImageJ software was used to analyse the average particle size. The area of each particle ($A_i$) was calculated and then converted to an equivalent diameter ($d_i$) of a sphere by $d_i=2\times (A_i/\pi)^{1/2}$. The number average diameter ($d_n$) of rubber particles is then obtained from $d_n=\Sigma_N d_i/N$ where N is the number of observed particles.

Heat Deflection Temperature (HDT). The HDT was measured by using an HDT tester (V-3216, China) under a bending stress of 1.80 MPa. The dimension of specimens is 80×10×4 mm3 and the heating rate is 120 2° C./hmin.

The present invention is demonstrated by the following non-limiting examples.

EXAMPLES AND FIGURES

Figure 1:
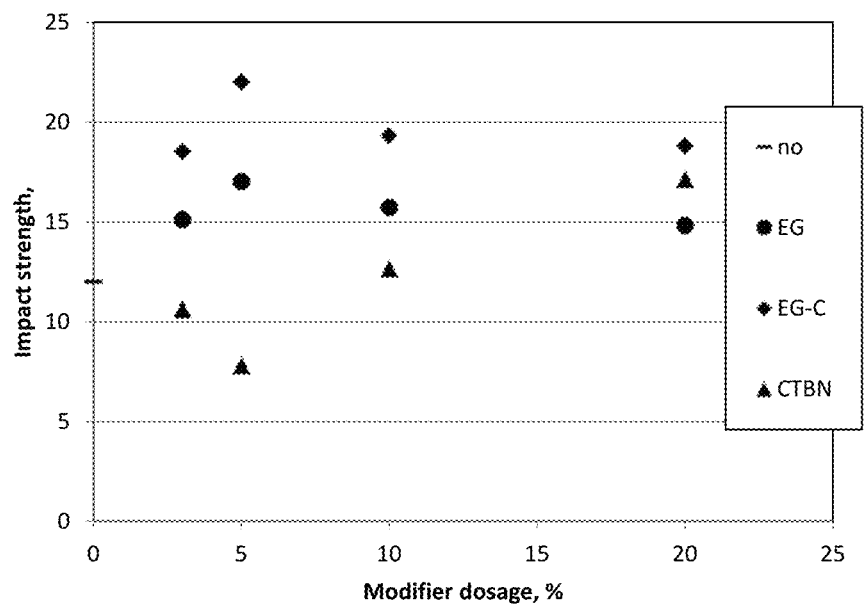
FIG. 1 shows the effect of the amount of modifier on the impact strength in the final epoxy resin.

Ethylene-glycidylmethacrylate-vinyl acetate polymer (60 wt % vinyl acetate and 3.1 wt % glycidyl methacrylate) was provided by Arlanxeo as Levapren NPG.

Phthalic anhydride was purchased from Aladdin Bio-Chem Technology Co., Ltd., China.

Tris (dimethylaminomethyl) phenol (DMP-30) used as catalyst was purchased from Aladdin Bio-Chem Technology Co., Ltd., China.

Methyltetrahydrophthalic (MTHPA) used as curing agent was purchased from Aladdin Bio-Chem Technology Co., Ltd., China.

Epoxy EPIKOTE 828 (EEW=184-190 g/equiv), a glycidyl-ether of bisphenol was purchased from Guangzhou Picks Chemical Co., Ltd., China, here referred to EP monomer Liquid acrylonitrile-butadiene copolymers with end carboxy end groups (CTBN) were purchased from Jinjiang Tonggao Chemical Co., Lit., China.

Ethanol and chloroform was provided from Sinopharm Chemical Reagent Co., Ltd., China.

All materials were used as provided.

1. Manufacture of Ethylene-Glycidylmethacrylate-Vinyl Acetate Polymer Comprising Phthalic Anhydride Modified Glycidyl Methacrylate Monomer Units Ethylene-glycidylmethacrylate-vinyl acetate polymer and phthalic anhydride (100/5, wt/wt) was blended in a Haake mixer (HAAKE Polylab-OS) at 60° C. at 50 rpm for 10 min to form a homogeneous mixture.

The temperature was then elevated to 150° C. at 50 rpm for a further 10 min.

The reaction mixture was then dissolved in chloroform and precipitated by the addition of ethanol to remove any unreacted phthalic anhydride. This was repeated three times.

The product was then dried in an oven for 20 mins at a temp of 55° C.

The grafting degree of phthalic anhydride was determined by $^1$H-NMR to 0.56%. The grafting efficiency GE with phthalic anhydride was 11.3%.

2. Manufacture of Epoxy Resins

Examples 2, 8, 9 and 10:50 g epoxy and various amount of the polymer according to the present invention were charged into a 250 mL beaker. The mixture was stirred at 110° C. for 3 h. After that, 45 g MTHPA curing agent (90 wt % of the EP monomer) and 0.75 g DMP30 catalyst (1.5 wt % of the EP monomer) were added and stirred for 30 min. As EP monomer Epikote 828 (medium viscosity liquid epoxy resin produced from bisphenol A resin and epichlorohydrin) from Hexion was used. After degassing in a vacuum oven, the mixture was poured into the mould and then cured at 80° C. for 2 h and then 130° C. for 2 h. Specimens were then prepared to analyse the epoxy resin for tensile and impact properties.

Examples 2*, 11*, 12* and 13*: Manufacture was carried like in the above examples except that polymer according to the present invention was exchanged for ethylene-glycidyl-methacrylate-vinyl acetate polymer.

Examples 18*, 19*, 20* and 21*: Manufacture was carried like in the above examples except that polymer according to the present invention was exchanged for liquid rubber modifier CTBN.

As a control example 1*, 50 g epoxy and various amount of ethylene-glycidylmethacrylate-vinyl acetate polymer were charged into a 250 mL beaker. The mixture was stirred at 110° C. for 12 h. After that, 45 g MTHPA curing agent (90 wt % of the EP monomer) and 0.75 g DMP30 catalyst (1.5 wt % of the EP monomer) were added and stirred for 30 min. After degassing in a vacuum oven, the mixture was poured into the mould and then cured at 80° C. for 2 h and then 130° C. for 2 h. Specimens were then prepared to analyse the epoxy resin for tensile and impact properties.

The various examples and analysis are shown in the below tables. Wherein * indicates comparative examples and "-" indicated not measured.

EG represents ethylene-glycidylmethacrylate-vinyl acetate polymer, EG-C represents polymer according to the present invention.

| Examples | 1* | 2* | 3 | 8 | 9 | 10 | 11* | 12* |
|---|---|---|---|---|---|---|---|---|
| Modifier | non | EG | EG-C | EG-C | EG-C | EG-C | EG | EG |
| Dosage (%) | 0 | 5 | 5 | 3 | 10 | 20 | 3 | 10 |
| Viscosity (Pa s) at shear rate of 10 s−1 | 1.1 | 1.7 | 1.9 | — | — | — | — | — |
| Peak exotherm (° C.) | 163.9 | 160.8 | 160.7 | — | — | — | — | — |
| Exothermic heat (J/g) | 183.2 | 180.2 | 178.2 | — | — | — | — | — |
| Tg (° C.) | 144 | 139 | 138 | — | — | — | — | — |
| $E_r$ (MPa) | 19.5 | 18.6 | 18.1 | — | — | — | — | — |
| Impact strength (kJ/m$^2$) | 12 | 17 | 22 | 18.5 | 19.3 | 18.8 | 15.1 | 15.7 |
| Tensile strength (MPa) | 63 | 62 | 61 | 62.9 | 61.4 | 39.1 | 63.2 | 60.2 |
| Bending strength (MPa) | 130 | 122 | 125 | 127 | 120 | 78.9 | 125 | 120 |
| Bending modulus (GPa) | 3.9 | 3.32 | 3.26 | 3.4 | 3.12 | 2.73 | 3.5 | 3.3 |
| Elongation at break (%) | 4.4 | 5.2 | 5.8 | 4.5 | 4.8 | 5.1 | 4.5 | 4.6 |
| HDT at 1.8 MPa(° C.) | 107 | 100 | 98 | — | — | — | — | — |

| Examples | 13* | 18* | 19* | 20* | 21* |
|---|---|---|---|---|---|
| Modifier | EG | CTBN | CTBN | CTBN | CTBN |
| Dosage (%) | 20 | 3 | 5 | 10 | 20 |
| Viscosity (Pa s) at shear rate of 10 s−1 | — | — | — | — | — |
| Peak exotherm (° C.) | — | — | — | — | — |
| Exothermic heat (J/g) | — | — | — | — | — |
| Tg (° C.) | — | — | — | — | — |
| $E_r$ (MPa) | — | — | — | — | — |
| Impact strength (kJ/m$^2$) | 14.8 | 10.6 | 7.79 | 12.65 | 17.12 |
| Tensile strength (MPa) | 31.1 | 52.6 | 47.5 | 51.3 | 38.6 |
| Bending strength (MPa) | 51 | — | — | — | — |
| Bending modulus (GPa) | 2.05 | — | — | — | — |
| Elongation at break (%) | 4.9 | 4.4 | 4.5 | 4.7 | 4.8 |
| HDT at 1.8 MPa(° C.) | — | — | — | — | — |

The examples clearly demonstrate that an impact strength and an elongation at break of the epoxy resins containing the polymer (modifier) according to the present invention are higher than that of the control.

FIG. 1 shows how the amount of modifier affects the impact strength in the final epoxy resin.

The impact strength is significantly improved using the modifier of the present invention.

Figure 2:
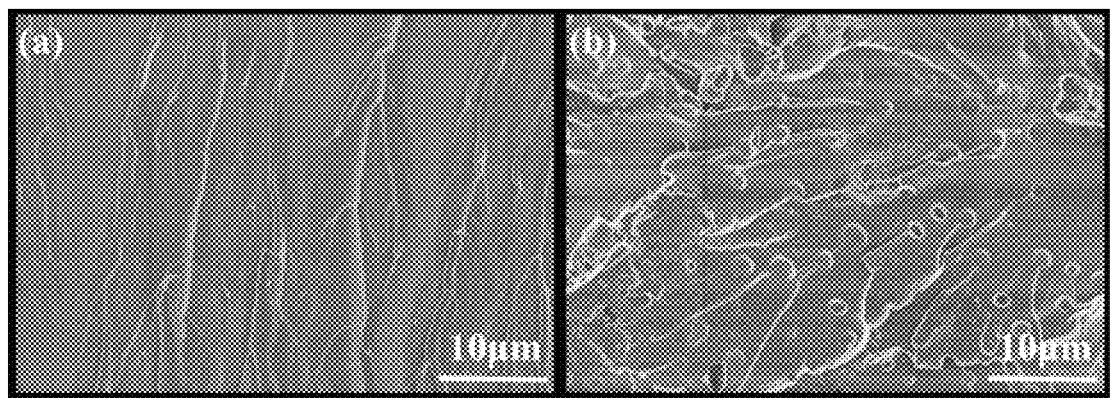
FIG. 2 shows impact fracture surfaces of different samples as analysed by SEM.
Figure 2:
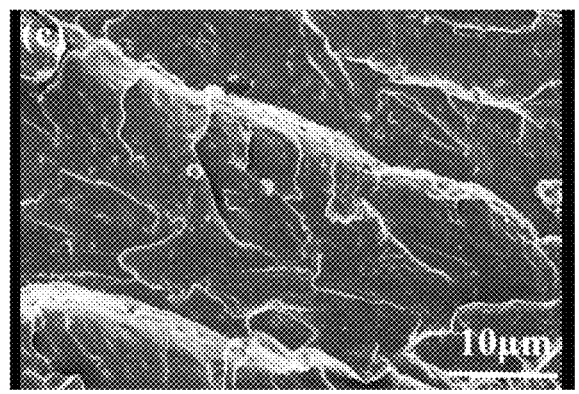

The impact fracture surfaces of samples was analysed by SEM and the results are shown in FIG. 2, namely (a) neat epoxy resin, (b) epoxy resin 5% modifier of ethylene-glycidylmethacrylate-vinyl acetate polymer, (c) epoxy resin 5% modifier of present invention.

The fracture surface of the neat (a) is smooth without any plastic deformation, indicating a typical brittle fracture. For the (b) epoxy resins the fracture surface exhibits some faintly visible plastic deformation, corresponding to the limited improvement in impact strength. Regarding to the (c) epoxy resins, the fracture surface becomes significantly rough, reflecting the increase in energy dissipation during the fracture process. Thus, the impact strength is highly improved. In addition, the uniform dispersion of the modifier according to the present invention facilitates the plastic deformation throughout the matrix of the epoxy resin, resulting in considerable energy dissipation.

As shown from the experiments a thermal stability of epoxy resins did not decrease substantially.

Figure 3:
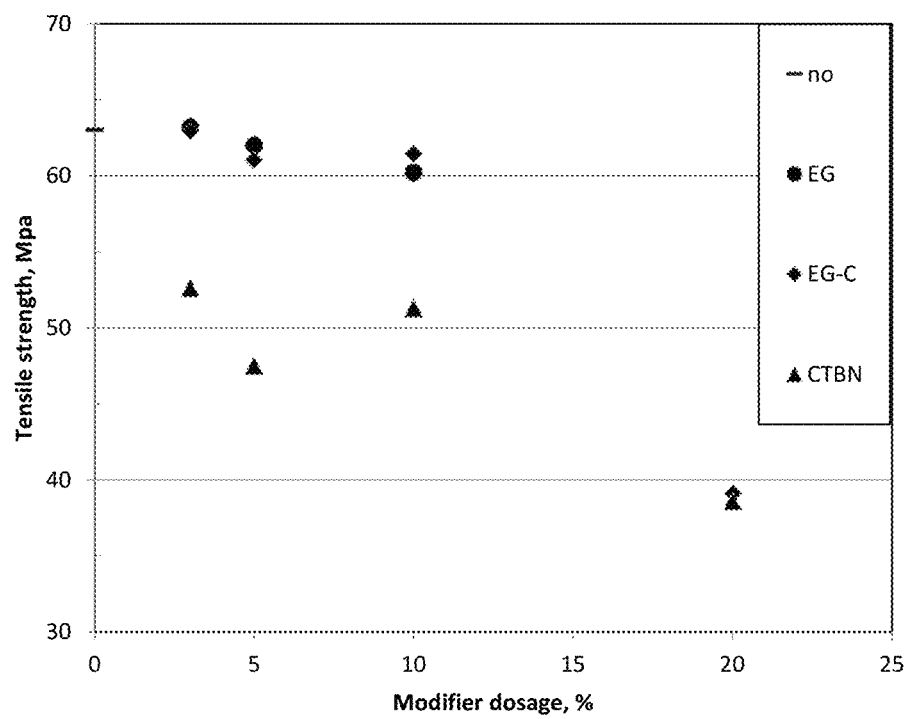
FIG. 3 shows the effect of the amount of modifier on the tensile strength in the final epoxy resin.

FIG. 3 shows how the amount of modifier affects the tensile strength in the final epoxy resin.

It is evident that tensile strength is maintained with up to 15% dosage of the modifier according to the present invention.

Figure 4:
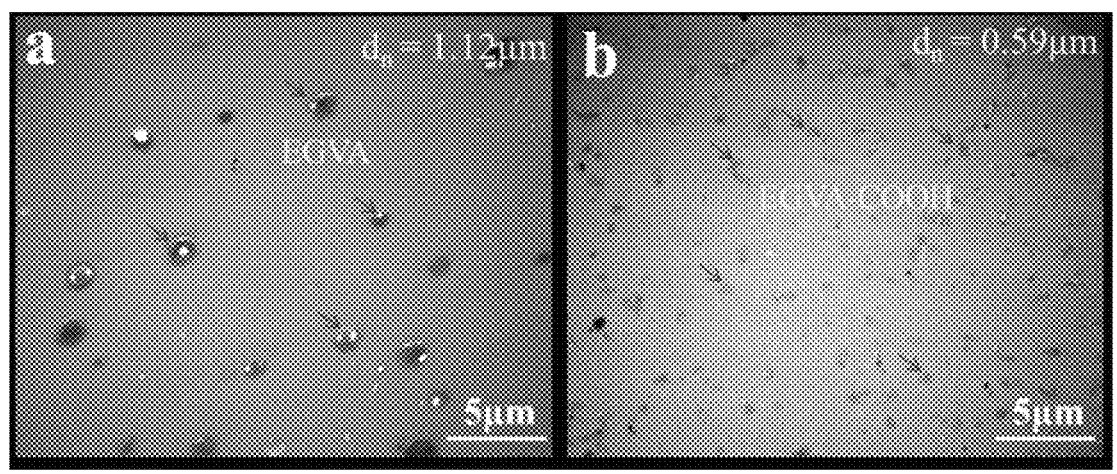
FIG. 4 shows the TEM images of a) the epoxy resin alone and b) the epoxy resin according to the present invention.

FIG. 4 shows the TEM images of a) the epoxy resin alone and b) the epoxy resin according to the present invention.

The TEM images clearly demonstrate that the use of the modifier according to the present invention leads to a smaller particle size of the rubbers in the epoxy resin. It is also noticeable that the dispersed rubber phase does not show smooth surfaces any more, instead an interphase is formed and the surface of the rubber particle is rough which indicates an increased interaction with the bulk epoxy resin whereby the bulk appears to maximise a contact interphase.

The examples clearly demonstrate the effects of the present invention.

Having thus described the present invention and the advantages thereof, it should be appreciated that the various aspects and embodiments of the present invention as disclosed herein are merely illustrative of specific ways to make and use the invention.

The various aspects and embodiments of the present invention do not limit the scope of the invention when taken into consideration with the appended claims and the foregoing detailed description.

What is desired to be protected by Letters Patent is set forth in the following claims:

1. A resin composition comprising an epoxy resin and a modifier, wherein the modifier comprises an ethylene-glycidylmethacrylate-vinyl acetate polymer comprising phthalic anhydride modified glycidyl methacrylate monomer units.

2. The composition according to claim 1, wherein a molecular weight of the ethylene-glycidylmethacrylate-vinyl acetate polymer comprising phthalic anhydride modified glycidyl methacrylate monomer units is at least 10,000 g/mol (Mn).

3. The composition according to claim 1, wherein monomer vinyl acetate is present in the ethylene-glycidylmethacrylate-vinyl acetate polymer comprising phthalic anhydride modified glycidyl methacrylate monomer units in a range of 25-75 wt %.

4. The composition according to claim 1, wherein monomer glycidyl methacrylate is present in the ethylene-glycidylmethacrylate-vinyl acetate polymer comprising phthalic anhydride modified glycidyl methacrylate monomer units in a range of 1-25 wt %.

5. The composition according to claim 1, wherein a grafting degree of phthalic anhydride in the ethylene-glycidylmethacrylate-vinyl acetate polymer comprising phthalic anhydride modified glycidyl methacrylate monomer units is at least 0.25%.

6. The composition according to claim 1, wherein a grafting degree of phthalic anhydride in the ethylene-glycidylmethacrylate-vinyl acetate polymer comprising phthalic anhydride modified glycidyl methacrylate monomer units is 100%.

7. The composition according to claim 1, wherein the amount of modifier in the composition is in a range of 2 to 12 wt.-%, referring to the epoxy resin.

8. The composition according to claim 1, wherein the ethylene-glycidylmethacrylate-vinyl acetate polymer comprising phthalic anhydride modified glycidyl methacrylate monomer units is gel-free.

9. A method for the manufacture of an ethylene-glycidylmethacrylate-vinyl acetate polymer, the method comprising reacting an ethylene-glycidylmethacrylate-vinyl acetate polymer with phthalic anhydride, wherein the ethylene-glycidylmethacrylate-vinyl acetate polymer is homogenised with the phthalic anhydride at a first temperature and then reacted at second temperature higher than the first temperature.

10. A kit for the manufacture of an epoxy resin, the kit comprising an ethylene-glycidylmethacrylate-vinyl acetate polymer comprising phthalic anhydride modified glycidyl methacrylate monomer units, a curing agent and an agent providing an epoxy functionality.

11. The kit according to claim 10, wherein the curing agent is an anhydride.

12. The kit according to claim 10, wherein the polymer is present in an amount of up to 15 wt %.

13. The kit according to claim 10, comprising one equivalent of curing agent with two equivalents of the agent providing an epoxy functionality.

14. The kit according to claim 10, further comprising at least one catalyst.

* * * * *